UNITED STATES PATENT OFFICE.

FRIEDRICH RUNKEL AND MARTIN HERZBERG, OF ELBERFELD, GERMANY, ASSIGNORS TO FARBENFABRIKEN VORM. FRIEDR. BAYER & CO., OF ELBERFELD, GERMANY, A CORPORATION OF GERMANY.

DYE.

958,830.   Specification of Letters Patent.   Patented May 24, 1910.

No Drawing.   Application filed January 29, 1910.   Serial No. 540,882.

*To all whom it may concern:*

Be it known that we, FRIEDRICH RUNKEL and MARTIN HERZBERG, doctors of philosophy, chemists, citizens of the German Empire, residing at Elberfeld, Germany, have invented new and useful Improvements in New Dyes, of which the following is a specification.

Our invention relates to the manufacture and production of new azo dyes which can be obtained by combining the diazo compounds of one molecule of an aminodiarylether sulfonic acid and one molecule of another diazo compound with one molecule of an 1.8-aminonaphthol sulfonic acid. The new dyestuffs thus obtained are after being dried and pulverized dark powders soluble in water. Upon reduction with stannous chlorid and hydrochloric acid they are decomposed, an aminodiarylether sulfonic acid, an amino compound and a diamino-1.8-aminonaphthol sulfonic acid are obtained.

The new coloring matters dye wool from blue to green to black shades remarkable for their fastness to washing and to milling.

In order to carry out our process we can proceed as follows, the parts being by weight:—26.5 parts of the sulfonic acid of ortho-aminophenylether obtained by dissolving the ortho-aminophenylether in concentrated sulfuric acid and pouring the solution into water are diazotized in the usual way. 23.9 parts of freshly precipitated 1.8-aminonaphthol-4-sulfonic acid are added to the mass of the reaction which has to be stirred until all will be entered into solution. After it has been rendered alkaline with sodium carbonate the diazo compound of 22 parts of para-chloro-ortho-aminophenylether are added. After some time the dye separates, it is filtered off, redissolved from hot water, filtered off, pressed and dried. It is after being dried and pulverized in the shape of its sodium salt a dark powder soluble in water with a dark blue and soluble in concentrated sulfuric acid with a dark-green color; yielding upon reduction with stannous chlorid and hydrochloric acid ortho-aminophenylether sulfonic acid, para-chloro-ortho-aminophenylether and 1.2.7-triamino-8-naphthol-4-sulfonic acid.

The new coloring matter dyes wool blue-black shades fast to washing and to milling.

The process is carried out in an analogous manner for the production of other of the above mentioned dyestuffs *e. g.* from 1.8-aminonaphthol-5-sulfonic acid, 1.8-aminonaphthol-3.6- or 4.6-disulfonic acid etc. and other sulfonic acids of aminodiarylethers *e. g.* of para-aminophenylether or of homologues or substitution products of alpha-aminophenylethers, or on using other diazo compounds of aminoarylethers or diazo compounds of other amins *e. g.* of dichloroanilin, 4-chloroanilin-2-sulfonic acid, para-toluidin-metasulfonic acid, ortho- or para-chloroanilin, para-nitranilin, meta-nitranilin, para- or ortho-toluidin, anilin, 1-methyl-2-amino-4-nitrobenzene, 1-naphthylamin, etc.

We claim:

1. The herein described new disazo dyestuffs obtainable from 1 molecule of a diazotized sulfonic acid of an aminodiarylether, 1 molecule of another diazo compound and 1 molecule of an 1.8-aminonaphthol sulfonic acid, which are after being dried and pulverized in the shape of their sodium salts dark powders soluble in water; yielding upon reduction with stannous chlorid and hydrochloric acid a sulfonic acid of an aminodiarylether, another amino compound and a diamino-1.8-aminonaphthol sulfonic acid; dyeing wool from acid baths from blue to green to black shades remarkable for their fastness to washing and to milling, substantially as described.

2. The herein described new disazo dyestuff obtainable from diazotized ortho-aminophenylether sulfonic acid, diazotized para-chloro-ortho-aminophenylether and 1.8-aminonaphthol-4-sulfonic acid, which dye is after being dried and pulverized in the shape of its sodium salt a dark powder soluble in water with a dark blue and soluble in concentrated sulfuric acid with a dark-green color; yielding upon reduction with stannous chlorid and hydrochloric acid ortho-aminophenylether sulfonic acid, para-chloro - ortho - aminophenylether and 1.2.7-triamino - 8 - naphthol - 4 - sulfonic acid; and dyeing wool blue - black shades remarkable for their fastness to washing and to milling, substantially as described.

In testimony whereof we have hereunto set our hands in the presence of two subscribing witnesses.

FRIEDRICH RUNKEL. [L. S.]
MARTIN HERZBERG. [L. S.]

Witnesses:
OTTO KÖNIG,
CHAS. J. WRIGHT.